United States Patent
Gong (10) Patent No.: US 8,515,916 B2
(45) Date of Patent: Aug. 20, 2013

(54) DATA ARCHIVING METHODS AND DATA ARCHIVING APPARATUS

(75) Inventor: Yu Gong, Half Moon Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 13/247,716

(22) Filed: Sep. 28, 2011

(65) Prior Publication Data
US 2013/0080395 A1 Mar. 28, 2013

(51) Int. Cl.
*G06F 17/00* (2006.01)
(52) U.S. Cl.
USPC .......................................... 707/661; 707/665
(58) Field of Classification Search
USPC ........................................................ 707/766
See application file for complete search history.

(56) References Cited

U.S. PATENT DOCUMENTS

| 7,836,022 | B2 | 11/2010 | Gillespie |
| 2005/0149584 | A1* | 7/2005 | Bourbonnais et al. ........ 707/204 |
| 2006/0149796 | A1 | 7/2006 | Aalmink |
| 2006/0206860 | A1 | 9/2006 | Dardinski et al. |
| 2007/0050333 | A1 | 3/2007 | Vogler |
| 2007/0288490 | A1 | 12/2007 | Longshaw |
| 2010/0114828 | A1 | 5/2010 | Persson |

\* cited by examiner

*Primary Examiner* — Belix M Ortiz Ditren (57) ABSTRACT

Data archiving methods and data archiving apparatus are disclosed. An example method includes storing a first relational data structure generated in connection with a first iteration of an archiving process; determining a status of the first relational data structure; and when the status is valid, using the first relational data structure in a second iteration of the archiving process.

20 Claims, 6 Drawing Sheets

DATA ARCHIVING METHODS AND DATA ARCHIVING APPARATUS

BACKGROUND

Databases are often archived to, for example, free up resources for newer data, to comply with rules or regulations, and/or to maintain long-term records. Typically, an archiving policy governs selection of data for relocation from a target database to an archive data store based on, for example, an age of data stored in a database. For example, an archiver may relocate data older than six months from the target database to the archive data store.

DETAILED DESCRIPTION

Database archiving typically involves relocating data from a first storage location to a second storage location sometimes referred to as an archive. The first storage location may store the data to be relocated in, for example, a database. A database to be archived is referred to herein as a target database. The archive to receive and store data from the target database is referred to herein as an archive data store. Typically, the target database is one that is accessed regularly and stores current data (e.g., data that was recently created, modified, and/or accessed), while the archive data store is accessed less often than the target database and stores data that is not current (e.g., data that was not recently created, modified, and/or accessed). An archive eligibility policy defines which data of the target database is eligible for relocation to the archive data store. For example, the eligibility policy may identify data of the target database as eligible for archiving when the data has not been created, modified, and/or accessed within the previous three months.

In addition to the eligibility policy that determines which data is eligible for an archiving process, many archiving processes are also governed by one or more archive constraints. An archive constraint defines which of the eligible data (e.g., according to the eligibility policy) of the corresponding target database should not be archived. For example, an archive constraint may restrict "open" data from being archived, where "open" data refers to data that is currently being used and/or accessed by a user of the target database (e.g., a client device in communication with the target database). Thus, a first example eligibility policy may identify a first row of data in the target database as eligible for a corresponding archiving process because the first row of data is at least three months old. However, the archive constraint of the example eligibility policy may restrict the eligible first row of data from being archived because some portion of the first row of data is "open" on a user machine when the example archiving process is executed. Otherwise, if no portion of the first row of data is "open" on a user machine when the example archiving process is executed, the eligible first row of data is relocated from the target database to the archive data store.

The restrictions of the archive constraint normally extend to dependent data in the target database. In such instances, when evaluating an eligible (e.g., according to the eligibility policy) row of data in the target database according to the archive constraint, other rows of data that are dependent on the eligible row of data are also evaluated using the archive constraint. For the eligible row of data to qualify under the archive constraint for archiving, the data dependent on the eligible row must also qualify under the archive constraint. To continue the above example, if a second row of data is dependent on the eligible first row of data, the second row of data is also evaluated according to the archive constraint. If the second row of data is "open," the first row of data is disqualified under the archive constraint and is not relocated to the archive data store. On the other hand, if the second row of data is not "open" and the first row of data is not "open," the first row of data is qualified under the archive constraint and is relocated to the archive data store (assuming that no other row(s) of data are dependent on the first row of data).

To evaluate data dependent on an eligible row of data in the target database, relational data structures are generated and analyzed. In some examples, the relational data structures are trees representative of dependency relationships between the data and/or rows of data of the target database. However, any suitable type and/or form of data structure can be generated and/or analyzed. Each node of the data structure is traversed when evaluating a row of data according to the archive constraint to determine whether each of the rows dependent on an eligible row meets the archive constraint. Generation of these prior relational data structures is a burdensome processing task that consumes considerable time and resources of a computing system. While the above example includes only a second row of data dependent on a first row of data, realistic data structures include many more levels of dependency. For example, a depth of over one million levels has been observed in Oracle® E-Business Suite applications. Therefore, the relational data structures can be extremely complex and time consuming to generate and/or analyze.

Conventional systems generate a relational data structure for each iteration of the archiving process. That is, each time the archiving process of a conventional system executes, the time and resource consuming task of generating the relational data structures is undertaken. This approach has long been considered unavoidable because data from the target database might have changed since a previous archiving iteration, thereby rendering prior relational data structures burdensome or even unusable. In many instances, the time and resources dedicated to the generation of the relational data structure for each archiving iteration accounts for a majority of the time and resources consumed by that archiving iteration.

Example methods, apparatus, systems, and/or articles of manufacture disclosed herein increase archiving performance by reusing a relational data structure from a prior archiving iteration in subsequent archiving iteration(s). Put another way, example methods, apparatus, systems, and/or articles of manufacture disclosed herein significantly reduce the time and resources needed to generate a relational data structure for an archiving process by storing and reusing at least a portion of one or more previously generated relational data structures. Example methods, apparatus, systems, and/or articles of manufacture disclosed herein realize that at least some, if not many portions of the relational data structures generated as part of an archiving process need not be reconstructed for each iteration of the archiving process. To avoid reusing portion(s) of the stored (previously generated) relational data structure(s) that are associated with dirty or stale data (e.g., data that has changed since the generation of the corresponding relational data structure(s)), example methods, apparatus, systems, and/or articles of manufacture disclosed herein check the validity of the stored relational data structure(s) before reusing one or more portions of the stored relational data structure(s). As described below, example methods, apparatus, systems, and/or articles of manufacture disclosed herein check the validity of the stored relational data structures by, for example, determining whether a dependency of data of the target database has been altered since the previous archiving iteration that produced the stored relational data structure(s). If the data of one or more portions of the previous relational data structure remains valid, example methods, apparatus, systems, and/or articles of manufacture disclosed herein reuse the one or more portions of the previous relational data structure in a current archiving iteration and, thus, eliminate the need to reconstruct the first portion during the current archiving iteration.

Figure 1:
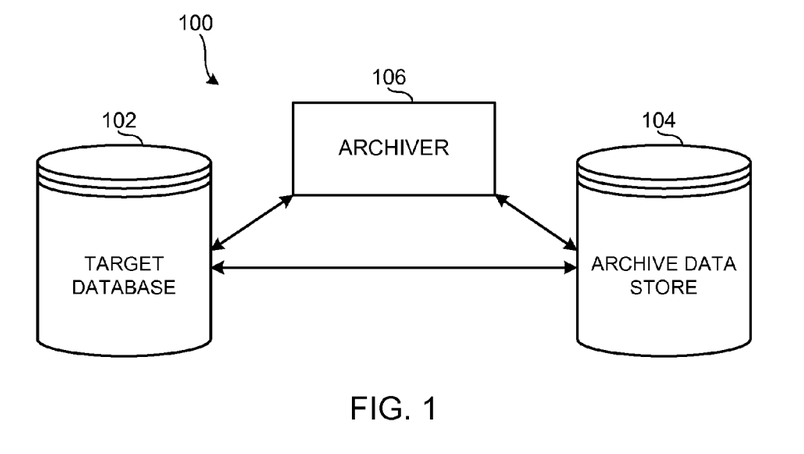
FIG. 1 illustrates an example data management system including an example archiver constructed in accordance with the teachings of this disclosure.

FIG. 1 illustrates an example data management system 100 implemented in accordance with the teachings of this disclosure. The example data management system 100 of FIG. 1 facilitates storage of data in a target database 102 and an archive data store 104. To relocate data from the target database 102 to the archive data store 104, the example data management system 100 of FIG. 1 employs an archiver 106. In comparison with previous archivers, the example archiver 104 of FIG. 1 operates more efficiently by reusing one or more valid portions of relational data structure(s) generated during one or more earlier archiving processes. Thus, the example archiver 104 enables a reuse of the prior relational data structure(s) without having to rebuild or regenerate the prior relational data structure from previous archiving processes or iterations.

Figure 2:
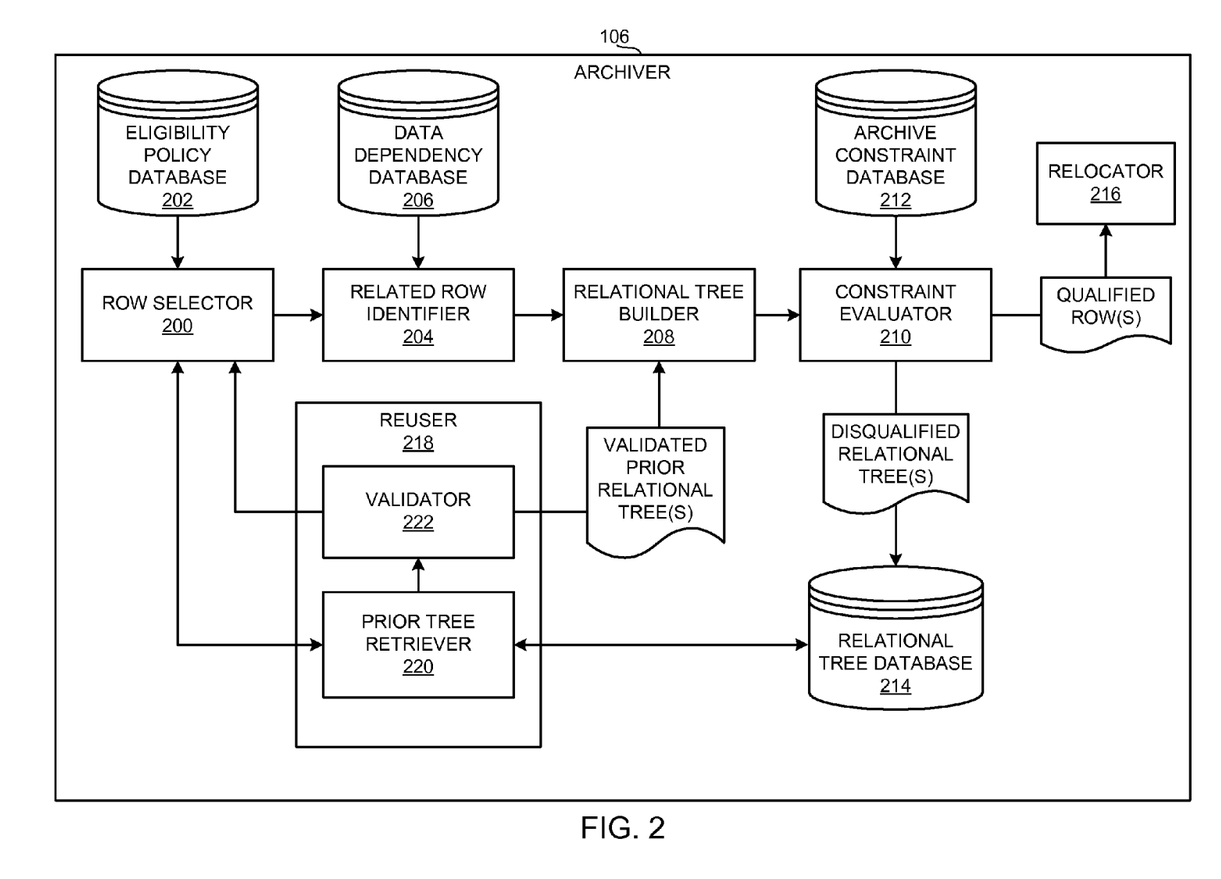
FIG. 2 is a block diagram of an example implementation of the archiver of FIG. 1.

FIG. 2 illustrates an example manner of implementing the example archiver 106 of FIG. 1. The example archiver 106 includes a row selector 200 to identify rows of data in the target database 102 of FIG. 1 that are eligible for relocation to the archive data store 104 of FIG. 1. In the illustrated example of FIG. 2, the row selector 200 references an eligibility policy database 202 that includes an eligibility policy that governs archiving of data from the target database 102 of FIG. 1 to the archive data store 104 of FIG. 1. The example eligibility policy database 202 of FIG. 2 also stores one or more archiving policies for other target databases, if any, of the data management system 100 of FIG. 1. When an archive process is triggered (e.g., according to a schedule and/or in response to an unscheduled initiation) in connection with the target database 102 of FIG. 1, the example row selector 200 retrieves and/or accesses the eligibility policy corresponding to the target database 102 from the eligibility policy database 202. The example row selector 200 uses the eligibility policy to identify data in the target database 102 that is eligible for the triggered archive process. In the illustrated example, the row selector 200 selects row(s) of data in the target database 102 that meet criteria of the eligibility policy for the target database 102. For example, the eligibility policy may define a row of data older than a threshold time period (e.g., has not been accessed, modified, and/or created in six months) as eligible for relocation to the archive data store 104. The eligibility policy may include additional and/or alternative criteria to further define which data is eligible for relocation to the archive data store 102. For example, data may have been designated as eligible for archiving by a user and/or application associated with the target database 102.

The example archiver 106 of FIG. 2 includes a related row identifier 204 to identify data dependent on the row(s) identified by the example row selector 200. The example related row identifier 204 of FIG. 2 references a data dependency database 206 that stores information indicative of dependencies between rows of data in the target database 102 and/or other target databases (if any) of the data management system 100. Dependent rows include, for example, rows that include a first data file that is linked to a second data file and may not function properly without the second data file. For example, the first data file may call an application or program implemented by the second data file, or vice versa. Additional or alternative types of dependency are identified and tracked by the example data dependency database 206 of FIG. 2.

The example archiver 106 of FIG. 2 includes a relational tree builder 208. The example relational tree builder 208 of FIG. 2 generates one or more relational trees using the row(s) identified by the row selector 200 and the dependenc(ies) identified by the related row identifier 204. In particular, the example relational tree builder 208 designates a first eligible row identified by the row selector 200 as a parent node for a first relational tree. The example relational tree builder 208 then designates entries of the target database 102 of FIG. 2 that are dependent on the first eligible row (as identified by the related row identifier 204) as child node(s) stemming from the parent node. The child nodes of the relational tree may also have data dependent thereon. Such nodes are grandchildren of the first eligible row (the parent node). In some instances, the example relational tree builder 208 generates relational trees having many levels of dependence (e.g., great grandchildren, great-great grandchildren, etc.). The resulting relational tree(s) provide a data structure that can be referenced to identify entries of the target database 102 that are dependent on rows of data eligible for relocation to the archive store 104 (subject to archive constraints).

Figure 3:
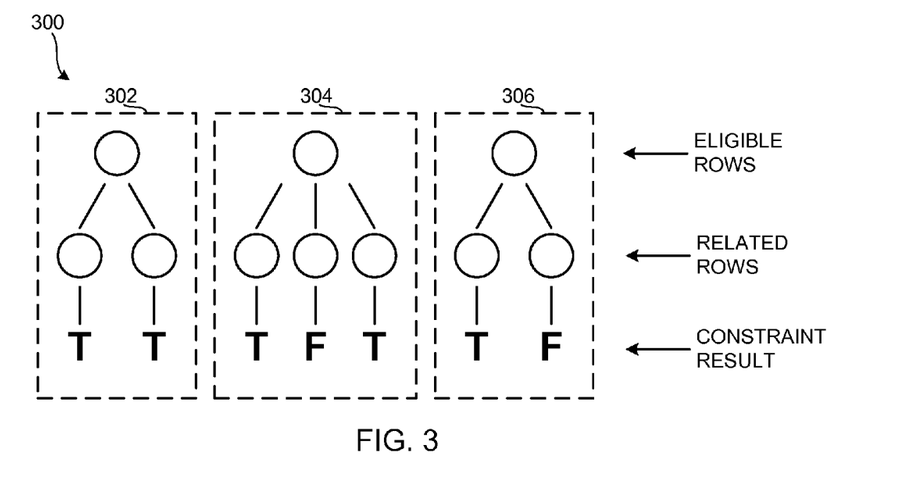
FIG. 3 is a diagram of example relational data structures generated by the example archiver of FIGS. 1 and/or 2.

An example data structure 300 generated by the relational tree builder 208 of FIG. 2 is shown in FIG. 3. The example data structure 300 of FIG. 3 corresponds to an example iteration of an archiving process implemented by the example archiver 106. In the illustrated example of FIG. 3, the row selector 200 identified three eligible rows and, thus, the relational tree builder 208 generated three relational trees, each corresponding to one of the eligible rows. For a first relational tree 302 corresponding to a first one of the eligible rows, the related row identifier 204 identified two dependent rows, which are shown as child nodes in the first relational tree 302. For a second relational tree 304 corresponding to a second one of the eligible rows, the related row identifier 204 identified three dependent rows, which are shown as child nodes in the second relational tree 304. For a third relational tree 306 corresponding to a second one of the eligible rows, the related row identifier 204 identified two dependent rows, which are shown as child nodes in the third relational tree 306. As described above, one or more of the child nodes may also have rows dependent thereon (as identified in the data dependency database 206). However, the example data structure 300 is a simplified example shown here for purposes of illustration and, thus does not illustrate additional level(s) of row(s) which may be present.

Referring back to FIG. 2, the illustrated example archiver 106 includes a constraint evaluator 210 that determines whether row(s) identified by the row selector 200 meet archive constraint(s). The example constraint evaluator 210 of FIG. 2 references an archive constraint database 212 that includes one or more constraints for the target database 102 and/or other (if any) databases utilizing the example archive data store 104 of FIG. 1. For example, an entry of the archive constraint database 212 corresponding to the target database 102 of FIG. 1 may prohibit data that is currently open on a machine from being archived in the archive data store 104 of FIG. 1. Additionally and/or alternatively, the entry of the archive constraint database 212 corresponding to the target database 102 of FIG. 1 may prohibit data having dependent data that is currently open on a machine from being archived in the archive data store 104 of FIG. 1. Additional and/or alternative types of constraints are possible and can be implemented by the example archive constraint database 212.

The example constraint evaluator 210 illustrated in FIG. 2 analyzes the relational tree(s) generated by the example relational tree builder 208 to determine whether the constraint(s) of the corresponding entry of the archive constraint database 212 are met by the eligible row and the rows dependent on the eligible row. That is, the example constraint evaluator 210 traverses the node(s) of the relational tree(s) and, for each node, determines whether the constraint(s) are met. If any of the nodes of a relational tree corresponding to an eligible row does not meet the constraint(s), the example constraint evaluator 210 of FIG. 2 disqualifies that eligible row from being relocated to the archive data store 104 of FIG. 1. Referring to FIG. 3, the example constraint evaluator 210 assigns an "F" for "False" to the nodes not meeting the constraint(s). The example constraint evaluator 210 of FIG. 2 provides the disqualified rows to a relational tree database 214 for potential reuse in subsequent iterations of the archiving process. The example relational tree database 214 is described in greater detail below.

On the other hand, if each of the nodes of a relational tree corresponding to an eligible row meets the constraint(s), the example constraint evaluator 210 of FIG. 2 qualifies that eligible row for relocation to the archive data store 104 of FIG. 1. Referring to FIG. 3, the example constraint evaluator 210 assigns a "T" for "True" to the nodes meeting the constraint(s). Further, the example constraint evaluator 210 of FIG. 2 provides the qualified rows to a relocator 216. The relocator 216 of the illustrated example performs an archiving procedure on the qualified rows. In the illustrated example, the archiving procedure includes removal of the qualified row(s) from the target database 102 and writing of the qualified row(s) into the archive data store 104. The example relocator 216 of FIG. 2 can perform any suitable type of archiving procedure on the qualified row(s) to archive data of the target database 102 into the archive data store 104.

Referring back to the example of FIG. 3, the first relational tree 302 corresponding to the first eligible row does not include a node that failed to meet the constraint(s) considered by the constraint evaluator 210 of FIG. 2 (e.g., all nodes corresponding to the first tree 302 meet the constraints). Thus, the first eligible row is provided or made available to the relocator 216 for archiving in the archive data store 104. Conversely, the second and third relational trees 304 and 306 include at least one node that failed to meet the constraint(s) according to the constraint evaluator 210 of FIG. 2. Thus, the second and third eligible rows are not provided to the relocator 216 as ready for archiving. Instead, the second and third eligible rows remain unarchived in the target database 102. Further, the second and third relational trees 304 and 306 corresponding to the second and third eligible rows are provided or made available to the relational tree database 214 for potential reuse in a subsequent iteration of the archiving process implemented by the example archiver 106.

As described above, the example relational tree database 214 includes one or more relational trees that were disqualified by the constraint evaluator 210. The example archiver 106 of FIG. 2 takes advantages of the prospect that the dependency relationship(s) reflected in the disqualified relational trees is likely to remain the same until another iteration of the archiving process is triggered. If the dependency relationship(s) of the stored relational tree(s) hold until the subsequent archiving iteration, those relational tree(s) can be reused in the subsequent archiving iteration. Reuse of the relational tree(s) saves a significant amount of time and resources consumed by the relational tree builder 208 to generate relational trees reflective of the data dependencies in the data dependency database 206.

To potentially reuse the stored relational trees of the relational tree database 214, the example archiver 106 includes a reuser 218. The example reuser 218 of FIG. 2 includes a prior tree retriever 220 and a validator 222. In the illustrated example of FIG. 2, after identifying row(s) in the target database 102 eligible for archiving, the example row selector 200 calls the example prior tree retriever 220 to determine whether the relational tree database 214 includes a relational tree corresponding to those eligible row(s). In other words, when the row selector 200 identifies a first row of the target database 102 as eligible for archiving during a current archiving iteration (e.g., according to an eligibility policy), the row selector 200 queries the relational tree database 214 via the prior tree retriever 220 to determine whether the relational tree database 214 includes a previously generated relational tree for the first row (e.g., a relational tree having the first row as the parent node). The example prior tree retriever 220 informs the row selector 200 whether or not the relational tree database 214 includes an entry for an eligible row.

In some instances, a user may have knowledge regarding the archiving iterations that may be useful to the example archiver 106. For example, the user may know if all or none of the prior results in relational tree database 214 is useful. For example, when a prior archive iteration did not complete successfully due to an unexpected fault, the archiving could be restarted after fixing the system problems. In such a scenario, the user may know that the target database did not change. In response, the user can instruct the prior tree retriever 220 to skip the validation functionality described below and to directly reuse all previously computed relational tree results in the database 214. In another example, if a period of time (e.g., greater than a threshold) has past since a last archiving iteration, the probability that most of the prior results are invalid becomes significantly higher. In such instances, the user may choose to assume that the prior results are invalid and to ignore and/or purge the corresponding entr(ies) of the relational tree database 214 (e.g., via an input provided to the archiver 106 by the user). Thus, the knowledge of the user about the usefulness of the preserved prior results can assist the archiver 106 in further enhancing the archiving process.

When the relational tree database 214 does includes an entry for an eligible row, the example prior tree retriever 220 of FIG. 2 also provides the corresponding relational tree to the validator 222 of the reuser 218. The example validator 222 of FIG. 2 determines whether the data dependencies of the prior relational tree are still valid. The validation process executed by the example validator 222 consumes far less resources than rebuilding an entire relational tree, thereby significantly increasing the efficiency of the archiving process. In some instances, the dependency of some data tied to the eligible row at the time of the generation of the prior relational tree may have changed due to, for example, deletion of one or more files, update(s) made to the eligible row and/or the dependent row(s), addition(s) of newly dependent data to the eligible row, etc. When dependency information associated with at least one of the nodes of the prior relational tree has changed since the generation of the prior relational tree, the validator 222 determines that the prior relational tree is invalid and cannot be reused in the current archiving iteration. In such instances, the example validator 222 informs the row selector 200 of the invalidity of the prior relational tree. In response, the row selector 200 and the other components of the archiver 106 proceed as if the eligible row was not previously identified and evaluated by the archiver 106. For example, the related row identifier 204 references the data dependency database 206 to identify the row(s) of data, if any, that are dependent on the first eligible row. Further, the relational tree builder 208 generates a relational tree for the first eligible row using the dependency information provided by the related row identifier 204.

On the other hand, when dependency information associated with each of the nodes of the prior relational tree has not changed since the generation of the prior relational tree, the validator 222 provides the prior relational tree to the relational tree builder 208. The example relational tree builder 208 incorporates the prior relational tree into the data structure to be provided to the constraint evaluator 210. The incorporation of the prior relational tree can be implemented by adding the prior relational tree to a list of relational trees to be evaluated by the constraint evaluator 210. Thus, the relational tree builder 208 is not required to generate a relational tree for the first eligible row having an entry in the relational tree database 214, thereby saving significant time and resources for the current archiving iteration.

In some examples, in a current archiving iteration, a prior condition (e.g., a file being open on a machine) that caused the prior relational tree to be disqualified by the constraint evaluator 210 in the previous archiving iteration is no longer present. If so, and if no other constraint is violated, the first eligible row can be qualified (by the constraint evaluator 210) and provided or otherwise made available to the relocator 216. Otherwise, the reused relational tree is disqualified again and provided or otherwise made available to the relational tree database 214 for potential subsequent use.

While an example manner of implementing the archiver 106 of FIG. 1 has been illustrated in FIG. 2, one or more of the elements, processes and/or devices illustrated in FIG. 2 may be combined, divided, re-arranged, omitted, eliminated and/or implemented in any other way. Further, any of the example row selector 200, the example eligibility policy database 202, the example related row identifier 204, the example data dependency database 206, the example relational tree builder 208, the example constraint evaluator 210, the example archive constraint database 212, the example relational tree database 214, the example relocator 216, the example reuser 218, the example prior tree retriever 220, the example validator 222, and/or, more generally, the example archiver 106 of FIG. 2 may be implemented by hardware, software, firmware and/or any combination of hardware, software and/or firmware. Thus, for example, any of the example row selector 200, the example eligibility policy database 202, the example related row identifier 204, the example data dependency database 206, the example relational tree builder 208, the example constraint evaluator 210, the example archive constraint database 212, the example relational tree database 2145, the example relocator 216, the example reuser 218, the example prior tree retriever 220, the example validator 222, and/or, more generally, the example archiver 106 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example row selector 200, the example eligibility policy database 202, the example related row identifier 204, the example data dependency database 206, the example relational tree builder 208, the example constraint evaluator 210, the example archive constraint database 212, the example relational tree database 214, the example relocator 216, the example reuser 218, the example prior tree retriever 220, the example validator 222, and/or, more generally, the example archiver 106 of FIG. 2 are hereby expressly defined to include a tangible and/or non-transitory computer readable medium such as a physical memory, DVD, CD, etc. storing the software and/or firmware. Further still, the example archiver 106 of FIG. 2 may include one or more elements, processes and/or devices in addition to, or instead of, those illustrated in FIG. 2, and/or may include more than one of any or all of the illustrated elements, processes and devices.

Figure 4:
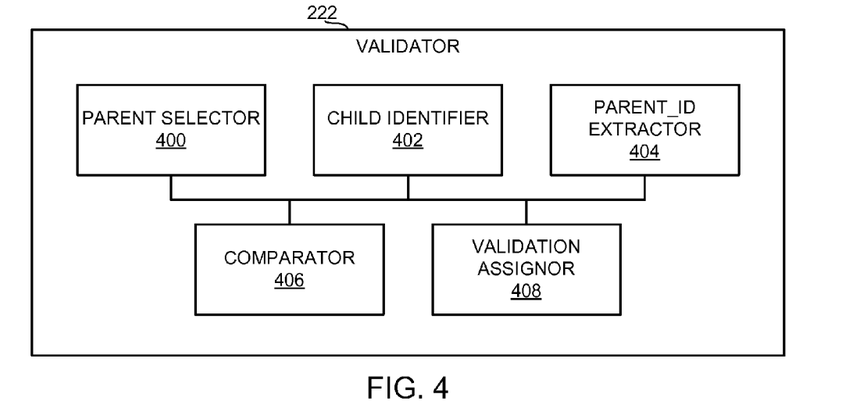
FIG. 4 is a block diagram of an example implementation of the validator of FIG. 1.

FIG. 4 illustrates an example apparatus that can be used to implement the example validator 222 of FIG. 2. The example validator 222 receives a prior relational tree from the relational tree database 214 and is requested to determine whether the dependencies reflected in the prior relational tree are still valid. That is, the example validator 222 is requested to determine whether one or more data dependencies of the prior relational tree have changed since the generation of the prior relational tree. As described in detail below, to make the determination the example validator 222 of FIG. 4 extracts information from the prior relational tree to be validated. The example validator 222 of FIG. 4 also references information from the data dependency database 206, which includes current data dependency information associated with entries of the target database 102. The example validator 222 of FIG. 4 compares the information extracted from the prior relational tree and the information from the data dependency database 206 to determine whether any dependency has changed in connection with the prior relational tree. If one or more of the dependencies have changed since the generation of the prior relational tree, the validator 222 of FIG. 4 invalidates the prior relational tree. Conversely, if none of the dependencies have change since the generation of the prior relational tree, the validator 222 of FIG. 4 validates the prior relational tree for use in the current archiving iteration.

The example validator 222 of FIG. 4 includes a parent selector 400 to select a parent node of a prior relational tree for validation. In the example of FIG. 3, the data structure 300 includes three parent nodes, each corresponding to a row of data in the target database 102. As the example validator 222 of FIG. 4 traverses the data structure 300 of FIG. 3, the example parent selector 400 chooses a first parent row of the first relational tree 302 for validation. After the first relational tree 302 of the data structure 300 is either validated or invalidated, the example parent selector 400 chooses, for example, the second relational tree 304 having a second parent row for validation. The parent selector 400 can choose the parent rows for validation in any suitable manner and/or order.

The example validator 222 of FIG. 4 includes a child identifier 402 to identify child nodes of the parent nodes selected by the parent selector 400. The example child identifier 402 of FIG. 4 identifies child nodes in the prior relational tree being evaluated by the validator 222 and in the data dependency database 206. As described below, the child nodes of the prior relational tree and the child nodes of the data dependency database 206 are compared to determine whether a dependency associated with the child nodes of the prior relational tree has changed since the generation of the prior relational tree.

The example validator 222 of FIG. 4 includes a parent_id extractor 404 to extract an identifier from the child nodes that identifies the parent of the respective child node. The example parent_id extractor 404 of FIG. 4 extracts parent_ids from the child nodes of the prior relational tree being analyzed by the validator 222 and the child nodes of the data dependency database 206. In some examples, additional or alternative data from the data dependency database 206 can be referenced and/or extracted to obtain the parent information associated with the child nodes tracked by the data dependency database 206.

The example validator 222 of FIG. 4 includes a comparator 406 to compare the parent_ids extracted by the parent_id extractor 404. Results generated by the example comparator 406 of FIG. 4 indicate whether a child node of the prior relational tree and the corresponding child node of the data dependency database 206 have the same parent node. In other words, the results of the example comparator 406 of FIG. 4 indicate whether the dependency of a child node of the prior relational tree has changed from the generation of the prior relational tree to the current archiving iteration. In some examples, the comparator 406 performs a comparison of the parent_ids of the child nodes and generates a binary determination of whether the parent_ids are the same. In such instances, a true or false indication is generated by the comparator 406. In some examples, the comparator 406 generates a count of parent_ids for the child nodes being analyzed by the comparator 406 as part of a comparison. In such instances, the comparator 406 increments the count for each distinctive parent_id. Thus, if a first child node (e.g., a child node from the prior relational tree) being analyzed by the comparator 406 as part of a first comparison has a first parent_id and a second child node (e.g., a child node from the data dependency database 206 reflective of the current state of the child node) being analyzed by the comparator 406 as part of the first comparison has a second parent_id different from the first parent_id, the comparator 406 generates a count equal to two. On the other hand, if the second child node has the first parent_id (the same parent_id as the first child node), the comparator 406 generates a count equal to one. If the count is not equal to one, the comparator 406 determines that the parent_id of the child node of the prior relational tree is different from the parent_id of the corresponding child node of the data dependency database 206 and, thus, the data dependency has changed since the generation of the prior relational tree. If the count is equal to one, the comparator 406 determines that the parent_id of the child node of the prior relational tree is not different from the parent_id of the corresponding child node of the data dependency database 206 and, thus, the data dependency has not changed since the generation of the prior relational tree.

In the illustrated example of FIG. 4, the comparator 406 provides an indication of whether the dependenc(ies) of the prior relational tree have changed to a validation assignor 408. If the comparator 406 determines that the data dependency of the child node has changed since the generation of the prior relational tree, the example validation assignor 408 assigns an invalid tag to the child nodes. On the other hand, if the comparator 406 determines that the data dependency of the child node has not changed since the generation of the prior relational tree, the example validation assignor 408 assigns a valid tag to the child nodes.

In analyzing the dependencies described above, the example archiver 106 utilizes unique or primary keys that are used to organize the parent nodes. The unique/primary keys enable the retrieval of the parent node information (e.g., a parent record) using one of the child record to be performed at high speed (e.g., a highest obtainable speed). On the other hand, if the access order is reversed, the high speed retrieval of the parent node information is not attained. Indexes or other lookup mechanisms are created on the unique/primary key columns of the parent tables. In connection with the examples disclosed herein, all necessary indexes/lookups have been created prior to the dependency evaluation(s) (e.g., validation(s)).

While an example manner of implementing the validator 222 of FIG. 2 has been illustrated in FIG. 4, one or more of the elements, processes and/or devices illustrated in FIG. 4 may be combined, divided, re-arranged, omitted, eliminated and/or implemented in any other way. Further, any of the example parent selector 400, the example child identifier 402, the example parent_id extractor 404, the example comparator 406, the example validation assignor 408, and/or, more generally, the example validator 222 of FIG. 4 may be implemented by hardware, software, firmware and/or any combination of hardware, software and/or firmware. Thus, for example, any of the example parent selector 400, the example child identifier 402, the example parent_id extractor 404, the example comparator 406, the example validation assignor 408, and/or, more generally, the example validator 222 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the example parent selector 400, the example child identifier 402, the example parent_id extractor 404, the example comparator 406, the example validation assignor 408, and/or, more generally, the example validator 222 of FIG. 4 are hereby expressly defined to include a tangible and/or non-transitory computer readable medium such as a physical memory, DVD, CD, etc. storing the software and/or firmware. Further still, the example validator 222 of FIG. 4 may include one or more elements, processes and/or devices in addition to, or instead of, those illustrated in FIG. 4, and/or may include more than one of any or all of the illustrated elements, processes and devices.

Figure 5:
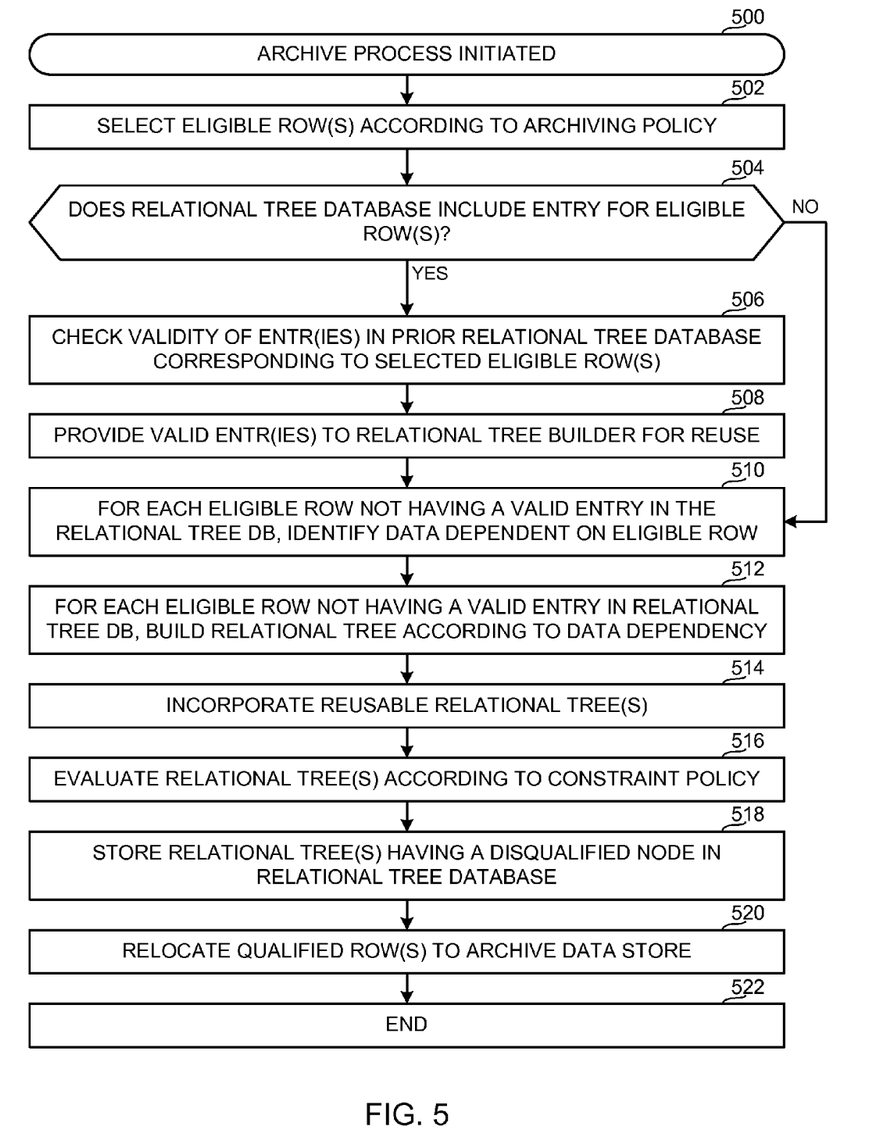
FIG. 5 is a flowchart representative of machine readable instructions that may be executed to implement the archiver of FIGS. 1 and/or 2
Figure 6:
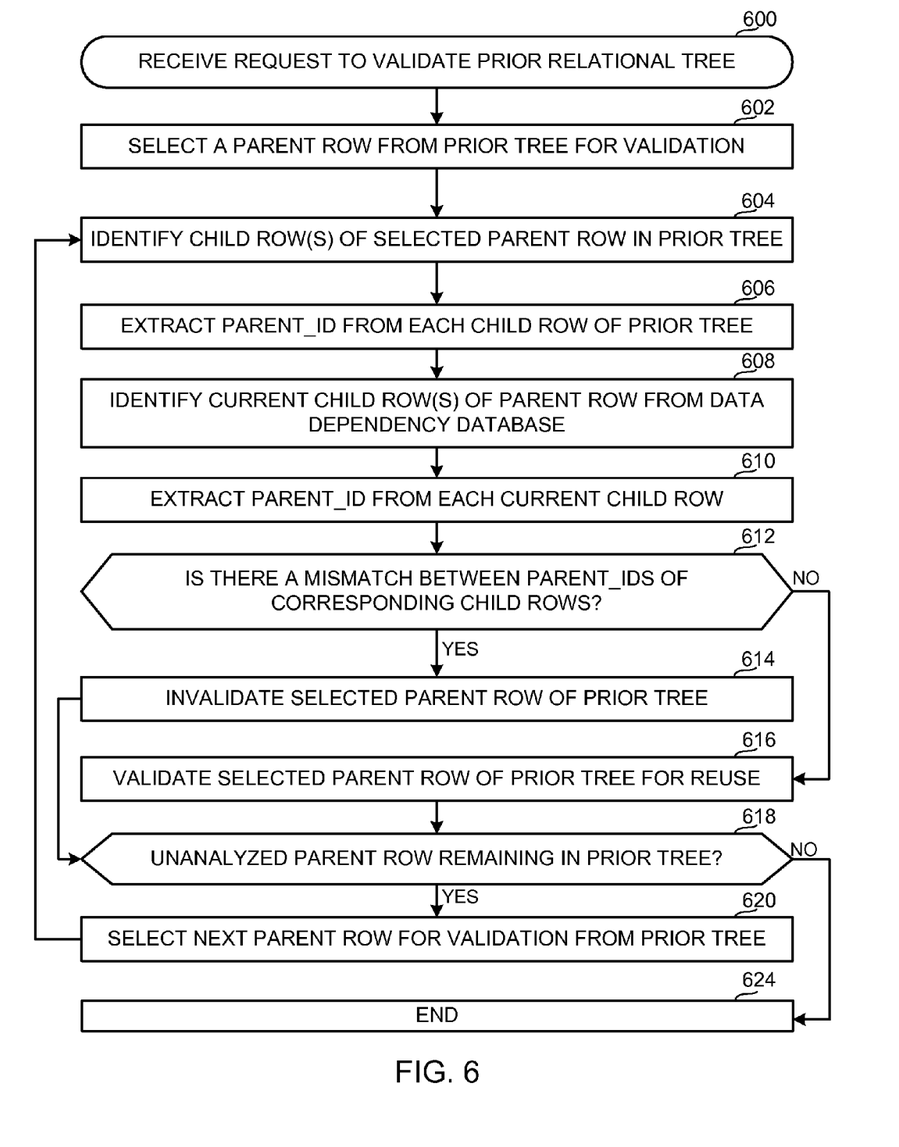
FIG. 6 is a flowchart representative of machine readable instructions that may be executed to implement the example validator of FIG. 2.

FIG. 5 is a flowchart representative of example machine readable instructions which may be executed to implement the example archiver 106 of FIGS. 1 and/or 2. FIG. 6 is a flowchart representative of example machine readable instructions which may be executed to implement the example validator 222 of FIGS. 2 and/or 4. In these examples, the machine readable instructions comprise programs and/or routines for execution by a processor such as the processor 712 shown in the example processor platform 710 discussed below in connection with FIG. 7. The programs may be embodied in software stored on a computer readable medium such as a CD-ROM, a floppy disk, a hard drive, a digital versatile disk (DVD), and/or any form of physical memory associated with the processor 712, but the entire program and/or parts thereof could alternatively be executed by a device other than the processor 712 and/or embodied in firmware or dedicated hardware. Further, although the example programs are described with reference to the flowcharts illustrated in FIGS. 5-6, many other methods of implementing the example archiver 106 and/or the example validator 222 may alternatively be used. For example, the order of execution of the blocks may be changed, and/or some of the blocks described may be changed, eliminated, or combined.

As mentioned above, the example processes of FIGS. 5-6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

FIG. 5 begins with an initiation of the example archiver 106 of FIGS. 1 and/or 2 to archive data in the target database 102 of FIG. 1 to the archive data store 104 of FIG. 1 (block 500). As described above, the example archiver 106 may be triggered by, for example, occurrence of a scheduled date and time or by a manual initiation. The example row selector 200 of FIG. 2 references the eligibility policy database 202 to access the archive eligibility policy that governs the target database 102 of FIG. 1. Using the appropriate eligibility policy, the row selector 200 selects eligible rows of data from the target database 102 for potential archiving into the archive data store 104 (block 502). The row selector 200 queries the relational tree database 216 via the prior tree retriever 220 to determine whether any of the eligible row(s) have a prior relational tree stored therein corresponding to a previous iteration of the archiving process implemented by the archiver 106 (block 504).

If any of the eligible row(s) of data have a prior relational tree stored in the relational tree database 216 (block 504), the example validator 222 determines whether the data dependenc(ies) of the prior relational tree(s) are still valid (block 506). Prior relational tree(s) from the previous archiving iteration having valid dependencies are provided or otherwise made available to the relational tree builder 208 for reuse (e.g., in the current archiving iteration) (block 508). Referring back to block 504, if none of the eligible row(s) of data have a prior relational tree stored in the relational tree database 216, control proceeds to block 510. At block 510, the related row identifier 204 identifies row(s) of data that are dependent on the eligible row(s) for each eligible row not having a valid prior relational tree (as determined at block 506). The example relational tree builder 208 generates a relational tree using the identified dependent rows for each eligible row not having a valid prior relational tree (as determined at block 506) (block 512). The example relational tree builder 208 also incorporates the valid prior relational tree(s) into the data structure for the current archive iteration (block 514). In some examples, incorporating the valid prior relational tree(s) involves adding the valid prior relational tree(s) to the relational tree(s) already generated by the example relational tree builder 208 using the dependent data identified by the related row identifier 204.

The example constraint evaluator 210 evaluates the relational tree(s) (e.g., prior relational tree(s) of the relational tree database 216 incorporated into the current archive iteration and/or relational tree(s) generated using data from the row selector 200 and the related row identifier 204) according to one or more archive constraints of the archive constraint database 212 (block 516). If one or more nodes of a relational tree violate the archive constraint(s), the example constraint evaluator 210 of FIG. 4 disqualifies data corresponding to that relational tree from being archived. Conversely, if each node of a relational tree meets the archive constraint(s), the example constraint evaluator 210 of FIG. 4 qualifies data corresponding to that relational tree for archiving. Relational trees having a node not meeting the constraint(s) are stored in the relational tree database 216 (block 518). Qualified data rows that meet the constraints are provided or otherwise made available to the relocator 214, which facilitates a relocation of the eligible row(s) corresponding to the relational tree to the archive data store 104 (block 520). The example flowchart of FIG. 5 then ends (block 522).

FIG. 6 begins with the example validator 222 of FIGS. 2 and/or 4 receiving a request to validate a prior relational tree from the relational tree database 216 (block 600). In some examples, the prior relational tree may have more than one eligible row and, thus, may include more than one parent node. In such instances, the parent selector 400 of FIG. 4 selects a parent row to validate (block 602). The child identifier 402 identifies the child row(s) of the selected parent row (block 604). The parent_id extractor 404 of FIG. 4 extracts the parent_id for the child row(s) (block 606). The child identifier 402 then identifies current child rows of the selected parent row in the data dependency database 206 (block 608). The parent_id extractor 404 extracts the parent_id for the child row(s) detected in the data dependency database 206 (block 610).

The comparator 406 of FIG. 4 determines whether there is a mismatch between the parent_id of any child rows of the prior relational tree and the corresponding child row of the data dependency database 206 (which reflects the current dependency of the child row) (block 612). If the comparator 406 determines that a mismatch exists in any of the child rows of the relational tree, the validation assignor 408 invalidates the selected parent row (block 614). Conversely, if the comparator 406 determines that no mismatches exist in any of the child rows of the relational tree, the validation assignor 408 validates the selected parent row (block 616). If any parent rows remain unanalyzed (block 618), the parent selector 400 selects another parent row for analysis and control returns to block 604 (block 620). Conversely, if no parent rows remain unanalyzed (block 618), the example flowchart of FIG. 6 ends (block 620).

Figure 7:
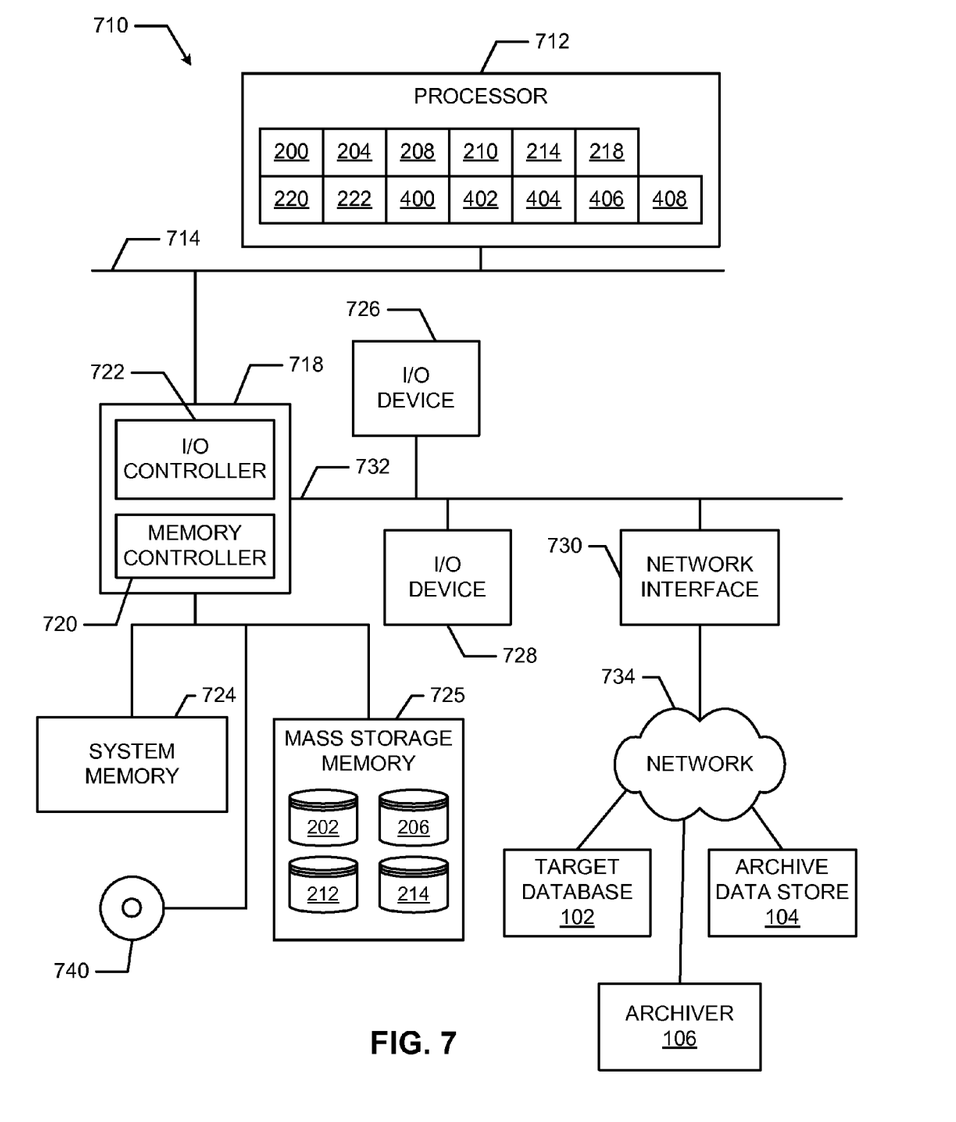
FIG. 7 is a block diagram of an example processor system capable of executing the example machine readable instructions of FIG. 5 to implement the example archiver of FIGS. 1 and/or 2 and/or the example machine readable instructions of FIG. 6 to implement the example validator of FIGS. 2 and/or 4.

FIG. 7 is a block diagram of an example processor system 710 that may be used to execute the machine readable instructions of FIG. 5 to implement the example archiver 106 of FIGS. 1 and/or 2 and/or to execute the machine readable instructions of FIG. 6 to implement the example validator 222 of FIGS. 2 and/or 4.

The example processor system 710 of FIG. 7 includes a processor 712 that is coupled to an interconnection bus 714. The processor 712 may be any suitable processor, processing unit, or microprocessor (e.g., one or more Intel® microprocessors from the Pentium® family, the Itanium® family or the XScale® family and/or other processors from other families). The system 710 may be a multi-processor system and, thus, may include one or more additional processors that are identical or similar to the processor 712 and that are communicatively coupled to the interconnection bus 714. In the illustrated example of FIG. 7, the processor 712 includes the row selector 200, the related row identifier 204, the relational tree builder 208, the constraint evaluator 210, the relocator 214, the reuser 218, the prior tree retriever 220, the validator 222, the parent selector 400, the child identifier 402, the parent_id extractor 404, the comparator 406, and the validation assignor 408.

The processor 712 of FIG. 7 is coupled to a chipset 718, which includes a memory controller 720 and an input/output (I/O) controller 722. A chipset provides I/O and memory management functions as well as a plurality of general purpose and/or special purpose registers, timers, etc. that are accessible or used by one or more processors coupled to the chipset 718. The memory controller 720 performs functions that enable the processor 712 to access a system memory 724, a mass storage memory 725, and/or a digital versatile disk (DVD) 740. In the illustrated example of FIG. 7, the mass storage memory 725 includes the archive policy database 202, the data dependency database 206, the archive constraint database 212, and the relational tree database 216. However, one or more of the databases 202, 206, 212, and/or 216 can be stored in alternative location(s) or memor(ies) associated with the example processor system 710 of FIG. 7.

In general, the system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc. The machine readable instructions of FIG. 57 may be stored in the system memory 724, the mass storage memory 725, and/or the DVD 740.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 702.11 device, a digital subscriber line (DSL) modem, a cable modem, a cellular modem, etc. that enables the processor system 710 to communicate with another processor system. The example network interface 730 of FIG. 7 is also communicatively coupled to a network 734, such as an intranet, a Local Area Network, a Wide Area Network, the Internet, etc. In the illustrated example of FIG. 7, the target database 102, the archiver 106 and the archive data store 104 are communicatively coupled to the network interface 730 via the network 734.

While the memory controller 720 and the I/O controller 722 are depicted in FIG. 7 as separate functional blocks within the chipset 718, the functions performed by these blocks may be integrated within a single semiconductor circuit or may be implemented using two or more separate integrated circuits.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A data archiving method, comprising:
storing a relational data structure generated in connection with a first iteration of an archiving process;
determining, using a processor, a status of the relational data structure prior to using the relational data structure in a second iteration of the archiving process; and
using the relational data structure in the second iteration if the status indicates the relational data structure has been validated.

2. A data archiving method as defined in claim 1, wherein the first relational data structure is stored in response to disqualification of corresponding data from the archiving process in connection with the first iteration of the archiving process.

3. A data archiving method as defined in claim 2, wherein the disqualification of the corresponding data occurs when the corresponding data fails to meet a constraint associated with the archiving process.

4. A data archiving method as defined in claim 1, wherein the relational data structure comprises a tree representative of a parent-child relationship between a first row of data and a second row of data.

5. A data archiving method as defined in claim 4, wherein the first row represents data from a first entry of a target database and the second row represents data dependent on the first entry of the target database.

6. A data archiving method as defined in claim 1, further comprising relocating data associated with the relational data structure to an archive during the second iteration of the archiving process when the data associated with the relational data structure meets a constraint associated with the archiving process during the second iteration.

7. A data archiving method as defined in claim 1, wherein the status indicates the relational data structure is validated when dependency information associated with a first portion of the relational data structure has not changed from the first iteration to the second iteration.

8. A tangible machine readable storage medium having instructions stored thereon that, when executed, cause a machine to at least:
evaluate a relational data structure according to an archiving constraint during a first iteration of an archiving process;
store the relational data structure when the relational data structure fails to meet the archiving constraint;
validate the stored relational data structure prior to using the stored relational data structure in a second iteration of the archiving process; and
use the stored relational data structure in the second iteration of the archiving process.

9. A machine readable medium as defined in claim 8, wherein the instructions are to cause the machine to validate the stored relational data structure by comparing a first parent identifier of the stored relational data structure to a second parent identifier of a current dependency database.

10. A machine readable medium as defined in claim 9, wherein the instructions are to cause the machine to invalidate the relational data structure when the first parent identifier and the second parent identifier are different.

11. A machine readable medium as defined in claim 8, wherein the instructions are to cause the machine to relocate data associated with a parent node of the relational data structure to an archive data store when the relational data structure meets the archiving constraint.

12. A machine readable medium as defined in claim 8, wherein the relational data structure is not stored when the relational data structure meets the archiving constraint.

13. A data archiving apparatus, comprising:
   a validator to determine a status of a first relational data structure generated in connection with a first iteration of an archiving process, the validator to validate the relational data structure by comparing a first parent identifier of the relational data structure to a second parent identifier of a data dependency database; and
   a reuser to, when the status is valid, use the first relational data structure in a second iteration of the archiving process; and
   at least one of the validator or reuser comprises a processor.

14. A data archiving apparatus as defined in claim 13, further comprising a data structure builder to incorporate the relational data structure into the second iteration of the archiving process.

15. A data archiving apparatus as defined in claim 13, further comprising a row selector to identify rows of a target database eligible for the archiving process.

16. A data archiving apparatus as defined in claim 15, further comprising a retriever to determine whether rows identified by the row selector correspond to an entry in a memory.

17. A data archiving apparatus as defined in claim 16, wherein the validator is to determine the status of the relational data structure when the retriever determines that the memory includes the relational data structure corresponding to the identified rows.

18. A data archiving apparatus as defined in claim 13, further comprising a relocator to convey data associated with the relational data structure to an archive data store in connection with the second iteration when the data associated with the relational data structure meets an archiving constraint in connection with the second iteration.

19. A tangible machine readable storage medium having instructions stored thereon that, when executed, cause a machine to at least:
   evaluate a relational data structure according to an archiving constraint during a first iteration of an archiving process;
   store the relational data structure when the relational data structure fails to meet the archiving constraint;
   use the stored relational data structure in a second iteration of the archiving process; and
   relocate data associated with a parent node of the relational data structure to an archive data store when the relational data structure meets the archiving constraint.

20. A tangible machine readable storage medium having instructions stored thereon that, when executed, cause a machine to at least:
   evaluate a relational data structure according to an archiving constraint during a first iteration of an archiving process;
   store the relational data structure when the relational data structure fails to meet the archiving constraint; and
   use the stored relational data structure in a second iteration of the archiving process,
   wherein the relational data structure is not stored when the relational data structure meets the archiving constraint.

* * * * *

UNITED STATES PATENT AND TRADEMARK OFFICE
CERTIFICATE OF CORRECTION

| | |
|---|---|
| PATENT NO. | : 8,515,916 B2 |
| APPLICATION NO. | : 13/247716 |
| DATED | : August 20, 2013 |
| INVENTOR(S) | : Yu Gong |

It is certified that error appears in the above-identified patent and that said Letters Patent is hereby corrected as shown below:

In the Claims:

In column 14, line 12, in Claim 2, before "relational" delete "first".

In column 15, line 17, in Claim 14, before "relational" insert -- first --.

Signed and Sealed this
Twelfth Day of November, 2013

Teresa Stanek Rea
*Deputy Director of the United States Patent and Trademark Office*